United States Patent
Perego et al.

(10) Patent No.: US 8,608,812 B2
(45) Date of Patent: Dec. 17, 2013

(54) PROCESS FOR PRODUCING HYDROCARBON FRACTIONS FROM MIXTURES OF A BIOLOGICAL ORIGIN

(75) Inventors: Carlo Perego, Carnate (IT); Luigina Maria Flora Sabatino, Milan (IT); Franco Baldiraghi, Melegnano (IT); Giovanni Faraci, San Donato Milanese (IT)

(73) Assignees: ENI S.p.A., Rome (IT); UOP LLC, Des Plaines, IL (US)

( * ) Notice: Subject to any disclaimer, the term of this patent is extended or adjusted under 35 U.S.C. 154(b) by 547 days.

(21) Appl. No.: 12/515,086

(22) PCT Filed: Nov. 7, 2007

(86) PCT No.: PCT/EP2007/009668
§ 371 (c)(1),
(2), (4) Date: Jul. 6, 2009

(87) PCT Pub. No.: WO2008/058664
PCT Pub. Date: May 22, 2008

(65) Prior Publication Data
US 2009/0300970 A1 Dec. 10, 2009

(30) Foreign Application Priority Data
Nov. 15, 2006 (IT) .................. MI06A2193

(51) Int. Cl.
*C10L 1/00* (2006.01)
(52) U.S. Cl.
USPC .......................................... 44/307
(58) Field of Classification Search
USPC ............. 502/14; 508/216; 585/274; 44/307
See application file for complete search history.

(56) References Cited

U.S. PATENT DOCUMENTS

| 4,734,540 A * | 3/1988 | Gattuso et al. ............... 585/274 |
| 7,560,408 B2 * | 7/2009 | Calemma et al. ............ 502/214 |
| 2003/0130554 A1 | 7/2003 | Flego et al. |
| 2006/0264684 A1 * | 11/2006 | Petri et al. ..................... 585/250 |
| 2007/0135316 A1 * | 6/2007 | Koivusalmi et al. ......... 508/216 |

FOREIGN PATENT DOCUMENTS

| EP | 0 582 347 | 2/1994 |
| EP | 0 908 231 | 4/1999 |
| EP | 1 396 531 | 3/2004 |

OTHER PUBLICATIONS

U.S. Appl. No. 12/637,232, filed Dec. 14, 2009, Perego, et al.

* cited by examiner

*Primary Examiner* — Prem C Singh
*Assistant Examiner* — Chantel Graham
(74) *Attorney, Agent, or Firm* — Oblon, Spivak, McClelland, Maier & Neustadt, L.L.P.

(57) ABSTRACT

A process is described for producing hydrocarbon fractions which can be used as diesel fuel or as components of diesel fuel, starting from a mixture of a biological origin containing esters of fatty acids possibly with amounts of free fatty acids, which comprises the following steps: 1) hydrodeoxygenation of the mixture of a biological origin; 2) hydroisomerization of the mixture resulting from step (1), after possible purification treatment, said hydroisomerization being effected in the presence of a catalytic system which comprises: a) a carrier of acid nature comprising a completely amorphous micro-mesoporous silico-alumina having a $SiO_2/Al_2O_3$ molar ratio ranging from 30 to 500, a surface area greater than 500 $m^2/g$, a pore volume ranging from 0.3 to 1.3 ml/g, an average pore diameter lower than 40 Å, b) a metallic component containing one or more metals of group VIII, possibly mixed with one or more metals of group VIB.

55 Claims, 3 Drawing Sheets

PROCESS FOR PRODUCING HYDROCARBON FRACTIONS FROM MIXTURES OF A BIOLOGICAL ORIGIN

Figure 1:
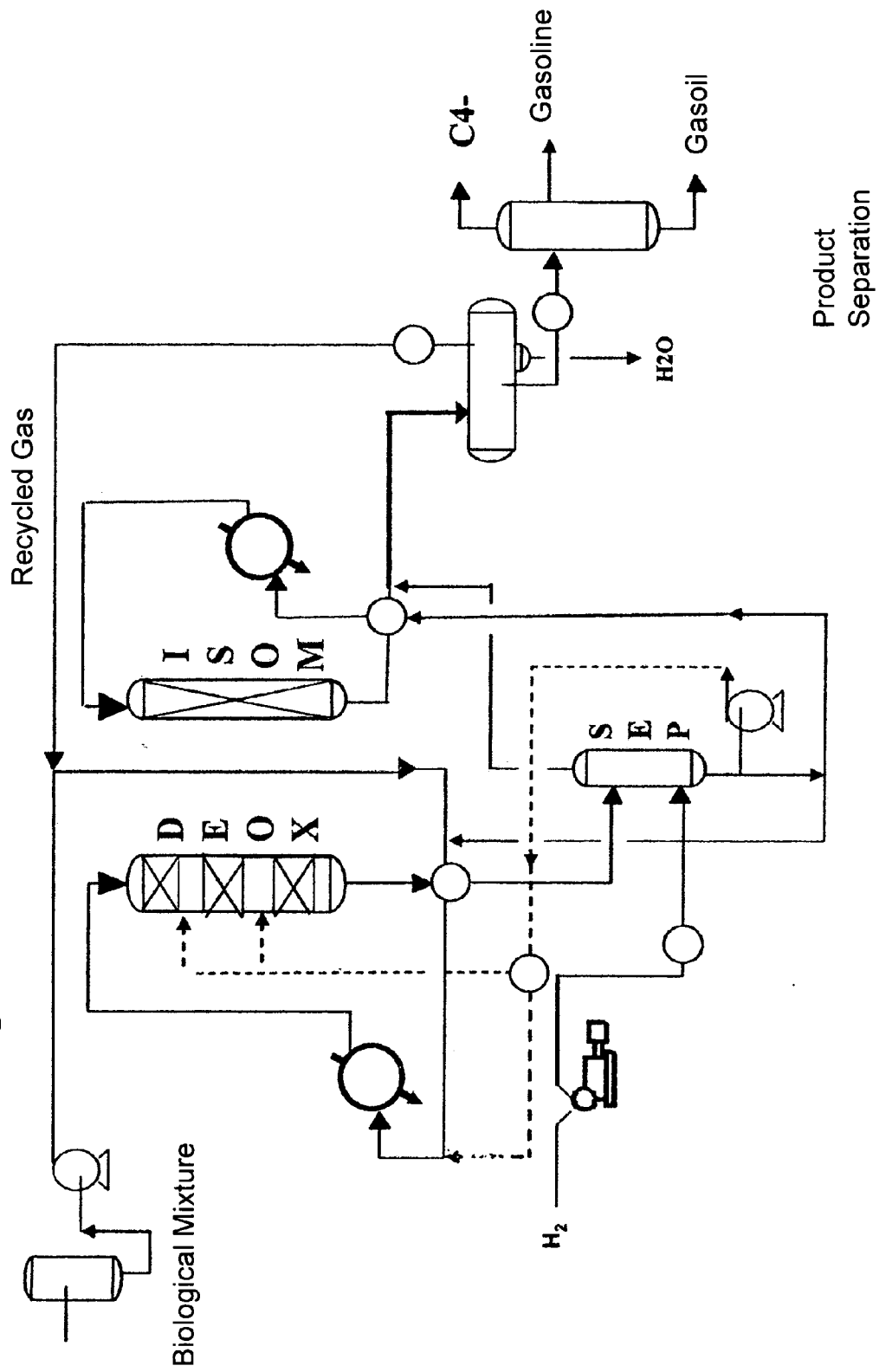

The present invention relates to a process for producing hydrocarbon fractions which can be used as diesel fuel or as a component of diesel fuel, starting from a mixture of biological origin containing esters of fatty acids possibly with amounts of free fatty acids. The process comprises at least one deoxygenation step and a hydroisomerization step. The use of vegetable oils in diesel engines goes back to Rudolf Diesel who, in 1900, demonstrated the capacity of diesel engines of functioning with peanut oil.

During the Second World War, use was made in Africa of both palm oil and peanut oil as fuel for military vehicles. After the war, technological development led to an almost exclusive use of fuels deriving from petroleum; furthermore, diesel engines were enormously improved, especially with respect to injectors and control systems, to such an extent that there was little flexibility for the use of fuels different from gas oil. Contemporaneously, vegetable fuels were progressively abandoned due to the high production cost and qualitative inconstancy of the product.

During the oil crisis of the seventies', attention was refocused on the use of vegetable oils as diesel fuels, but this was difficult for various reasons (formation of crusting in the internal combustion engine, blockage of the injectors, dilution of the lubricant). Research was then directed towards the preparation, starting from vegetable oils, of methyl or ethyl esters and their use in diesel engines. Methyl and ethyl esters of fatty acids are obtained from vegetable oils by transesterification with methanol or ethanol. An alternative approach for the conversion of vegetable oils was proposed in the eighties' and consists in the forced hydrogenation of these to produce hydrocarbon fractions with a boiling point compatible with diesel fuels obtained from oil. The forced hydrogenation of vegetable oils causes the removal of oxygen with the contemporaneous formation of a mixture of $H_2O$, $CO_2$ and CO, in reciprocal ratios varying according to the operative conditions. The starting ester is thus prevalently transformed into hydrocarbons with respect to both the fatty acids and glycerin. Small free alcohols can be formed together with the hydrocarbons.

The forced hydrogenation reaction of fatty oils to produce liquid fuels was studied for example, still in the eighties', by Nunes et al., who, in the article entitled "Hydrocraquage sous pression d'une huile de soja: procédé d'étude et allure générale de la transformation" (Rev. Inst. Fr. Pet. 1986, vol. 41, page 421 onwards) describe the hydrocracking of soya oil with a bifunctional catalyst. At a temperature higher than 673 K, decarbonylation and decarboxylation of the fatty acids are observed, together with a distinct hydrogenolysis due to the presence of the metallic catalyst. The main products are linear-chain hydrocarbons.

J. Gusmao et al. (Utilization of vegetable oils as an alternative source for diesel-type fuel: hydrocracking on reduced $Ni/SiO_2$ and sulphided $Ni-Mo/Al_2O_3$, Catalysis Today 5 of 1989 page 533 onwards) demonstrates how, in the hydrogenation of soya oil, the hydrocarbon fraction obtained mainly consists of linear paraffins (96% molar of $C_{15}$-$C_{16}$-$C_{17}$-$C_{18}$).

U.S. Pat. No. 4,992,605 describes a process for producing hydrocarbon fractions in the $C_{15}$-$C_{18}$ range by the hydrogenation of vegetable oils such as sunflower oil, rape oil, canola oil, palm oil, or fatty oils contained in the pulp of pine trees (tall oil). This hydrocarbon fraction prevalently consists of linear paraffins ($C_{15}$-$C_{18}$) and is characterized by a high cetane number, which is such that it can be used an a cetane improver.

In "Hydroprocessed vegetable oils for diesel fuel improvement", Bioresources Technology 56 (1996), pages 13 to 18, the application described in U.S. Pat. No. 4,992,605 is summarized on a laboratory scale to produce a hydrogenated product starting from canola oil. The hydrocarbon fraction almost exclusively consists of linear paraffins and the fraction which distills within the distillation range of diesel fuel, has a cetane number ranging from 55 to 90. Other hydrogenation products include light $C_1$-$C_5$ hydrocarbons, water and $CO_2$. The diesel fraction is defined "super cetane". The density (0.790 g/ml) is compatible with diesel fuel, whereas the viscosity is slightly higher. The real limit of this fraction however is linked to the poor cold temperature properties (cloud and pour points) associated with the linearity of paraffins, which exceed 20° C. For this reason, the "super cetane" fraction can be used in a mixture with conventional diesel but not during the winter months.

EP 1396531 describes a process for the production of hydrocarbon components from mixtures of a vegetable or animal origin. The formation of a mixture with a content of iso-paraffins of 73%, is described. The process comprises a pre-hydrogenation step, a hydrodeoxygenation step (HDO) and an isomerization step which operates using the countercurrent flow principle. The pre-hydrogenation step, which is carried out under bland conditions, is necessary for saturating rating the double bonds present and avoiding undesired side-reactions in the subsequent process steps. In the isomerization steps it is absolutely indispensable to operate in countercurrent to protect the catalyst from deactivation caused by the water contained in the feeding deriving from the previous HDO step: when operating in countercurrent, part of the water contained in the hydrocarbon feeding is removed, before said feeding comes into contact with the whole catalyst of the catalytic bed.

A process has now been found for the production of a hydrocarbon mixture which can be used as diesel fuel or as a component for gas oil by the hydrodeoxygenation of a mixture of biological origin containing esters of fatty acids possibly with amounts of free fatty acids, such as vegetable oils for example, such as sunflower, rape, canola, palm oils, or fatty oils contained in the pulp of pine trees (tall oil), followed by hydroisomerization, which allows hydrocarbon mixtures to be obtained, in which the content of isoparaffins can exceed 80%, the remaining part being n-paraffins.

The particular catalytic compositions which are used in the hydroisomerization step not only allow a higher-quality product to be obtained as diesel fuel with respect to those of the cuts obtained with the known processes, but they also have characteristics which allow them to be used in the presence of water without undergoing deactivation or in any case to be easily regenerated during the hydroisomerization itself by means of a moderate temperature rise.

The object of the present invention therefore relates to a process for producing a hydrocarbon fraction which can be used as diesel fuel or as a component of diesel fuel, starting from a mixture of a biological origin containing esters of fatty acids, and possibly also containing free fatty acids, which comprises the following steps:

1) hydrodeoxygenation of the mixture of a biological origin;
2) hydroisomerization of the mixture resulting from step (1), after possible purification treatment, said hydroisomerization being carried out in the presence of a catalytic system which comprises:

a) a carrier of acid nature comprising a completely amorphous micro-mesoporous silico-alumina having a $SiO_2/Al_2O_3$ molar ratio ranging from 30 to 500, a surface area greater than 500 m$^2$/g, a pore volume ranging from 0.3 to 1.3 ml/g, an average pore diameter lower than 40 Å, b) a metallic component containing one or more metals of group VIII, possibly mixed with one or more metals of group VIB.

The mixtures of biological origin used in the process of the present invention contain esters of fatty acids, possibly with amounts of free fatty acids, and they can be mixtures of vegetable or animal origin. The amount of fatty acids can vary for example from 2 to 20% by weight with respect to the total mixture of a biological origin. The esters of fatty acids contained in said mixtures are typically triglycerides of fatty acids, wherein the hydrocarbon chain of the fatty acid can contain from 12 to 24 carbon atoms and can be mono- or poly-unsaturated. The mixtures of biological origin can be selected from vegetable oils, vegetable fats, animal fats, fish oils or mixtures thereof. Vegetable oils or fats can be sunflower, rape, canola, palm, soybean, hemp, olive, linseed, peanut, castor, mustard, coconut oils or fatty oils contained in the pulp of pine trees (tall oil), or mixtures thereof. Animal oils or fats can be selected from bacon-fat, lard, tallow, milk fats, and mixtures thereof. Recycled fats or oils of the food industry, of either animal or vegetable origin, can also be used. The vegetable oils or fats can also derive from plants selected by genetic manipulation.

The mixtures of a biological origin used in the process of the present invention can also be mixed with other components before being fed to the process, for example mixed with one or more hydrocarbons.

In the first step (HDO step) the mixture of a biological origin is hydrodeoxygenated with hydrogen in the presence of a hydrodeoxygenation catalyst.

In this step, there is the hydrogenation of the double bonds present in the ester chains of the triglycerides, the cracking of the triglyceride structure and deoxygenation by means of both decarboxylation and hydrogenation with the formation of water.

The catalysts which can be used are all hydrogenation catalysts known in the art containing one or more metals selected from metals of group VIII and group VIB, suitably supported. Suitable supports for the purpose consist of one or more metallic oxides, preferably alumina, silica, titania, zirconia or mixtures thereof. The metal or metals are preferably selected from Pd, Pt, Ni, or from pairs of metals Ni—Mo, Ni—W, Co—Mo and Co—W, Ni—Mo and Co—Mo being preferred. These catalysts are typically prepared by impregnation of the oxide carrier with a solution of a suitable salt of the metal or metals. The impregnation is then followed by thermal treatment in an atmosphere suitable for decomposing the precursor salt and obtaining the supported metal. It is possible to proceed with successive impregnations to reach the desired charge level of the metal and, in the case of various metals, also to differentiate their supporting. Processes are also known for the production of said catalysts, instead of by impregnation, by precipitation of the metallic precursor from a saline solution of the metal itself on the carrier, or by co-precipitation of the various catalyst components, i.e. the metal and carrier.

Catalytic compositions can also be used, such as Ni—Mo—P on zeolite, Pd/Zeolite, Pt/MSA, wherein MSA is a silico-alumina having particular characteristics, described in EP 340868, EP659478, EP812804, and also used as carrier for the catalytic compositions adopted in the subsequent hydroisomerization step. Catalysts which can be well used in the HDO step of the present invention are described for example in J. T. Richardson, "Principal of catalyst development", Plenum Press, New York, 1989, Charter 6.

Catalysts of the Ni—Mo, Ni—W, Co—Mo and Co—W type are previously sulfided. The presulfidation procedures are effected according to the known techniques.

In order to keep the catalyst in sulfided form, the sulfidizing agent, for example dimethyldisulfide, is fed contemporaneously with the charge of biological origin, after a possible purification step of said charge, in amount ranging from 0.02 to 0.5% by weight (140-3400 ppm S).

Alternatively, it is possible to proceed with the co-feeding of a "straight run" gas oil with a high S content (S>1%), in such a concentration that it almost corresponds to the same overall S content in the charge.

The HDO reaction is carried out in a reaction zone comprising one or more catalytic beds, in one or more reactors. According to a preferred aspect, it is carried out in a typical fixed bed hydrotreating reactor. The flow of hydrogen and feedstock of biological origin can be sent in equicurrent or countercurrent. The reactor can have adiabatic catalytic beds in a number higher than or equal to 2. As it is an exothermic reaction, with the production of heat, there is a temperature rise in each catalytic bed. By means of the feeding, between one catalytic bed and the other, of a stream of hydrogen and/or liquid feed at a defined temperature, it is possible to obtain a constant or increasing temperature profile. This operating procedure is normally indicated as "splitted feed".

Alternatively to an adiabatic layered reactor, resort can be made to a tube-bundle reactor. The catalyst is suitably charged inside the tubes, whereas a diathermic liquid (dowtherm oil) is sent to the mantle side to remove the reaction heat.

For a better regulation of the thermal profile in the reactor whether this be with adiabatic layers or tube-bundle, the reactor itself can be run with the recirculation of a part of the effluents, according to the typology known as recycling reactor. The function of the recycling is to dilute the fresh feed in the reactor thus limiting the thermal peaks due to the exothermicity of the reaction. The recycling ratio, i.e. the amount of recirculated fraction with respect to the fresh charge can vary from 0.5 to 5 wt/wt.

A further reactor configuration which can be used for this application is a slurry reactor in which the hydrodeoxygenation catalyst is suitably formed in microspheres and dispersed in the reaction environment. The gas-liquid-solid mixing in this case can be favoured by mechanical stirring or by forced recirculation of the reaction fluids.

The HDO step is preferably carried out at a pressure varying from 25 to 70 bar, preferably from 30 to 50 bar, and at a temperature ranging from 240 to 450° C., preferably from 270 to 430° C. It is preferable to operate with an LHSV ranging from 0.5 to 2 hours$^{-1}$, even more preferably from 0.5 to 1 hours$^{-1}$. The $H_2$/mixture of biological origin ratio preferably ranges from 400 to 2,000 Nl/l.

Before the HDO step, the feedstock of biological origin can be suitably treated in order to remove the content of alkaline metals (for example Na, K) and alkaline earth metals (for example Ca), possibly contained in the charge. This pretreatment can be carried out by adsorption on a suitable material: for example the known percolation techniques can be used on a column filled with acid earth or clays such as for example montmorillonites, bentonites, smectites, acid sepiolites. For this purpose, the products available on the market such as Filtrol, Tonsil, Bentolites H and L, SAT-1, can be used.

Alternatively, ion exchange resins can be used, or slightly acid washings obtained for example by contact with sulfuric acid, nitric acid or hydrochloric acid, preferably at room temperature and atmospheric pressure.

The effluents of the HDO step (1) are preferably subjected to purification treatment before being sent to the subsequent hydroisomerization step. The purification treatment can comprise a separation step and a washing step. According to this preferred aspect, the effluents of step (1) are sent to a high pressure gas-liquid separator. A gaseous phase essentially consisting of hydrogen, water, CO and $CO_2$ and light paraffins (C4$^-$) is recovered. $NH_3$, $PH_3$ and $H_2S$ can also be present in small quantities. After separation, the gaseous phase is cooled and the water (possibly containing traces of alcohols and carboxylic acids) and condensable hydrocarbons are separated by condensation. The remaining gaseous phase is purified to allow the recycling of the hydrogen to reaction step (1). Methods of the known art are adopted for the purification, by means of caustic washings, for example with aqueous solutions of NaOH or $Ca(OH)_2$, or by means of the well-known purification technique with amines (for example MEA, monoethanolamine, or DEA, diethanolamine). At the end of the purification the $CO_2$, $H_2S$, $PH_3$ and $NH_3$ are removed and the gaseous fraction thus obtained essentially consists of $H_2$ with possible traces of CO. In order to limit the accumulation of CO in the recycled gases, it can be removed by cuproammonia washing or by methanation, according to technologies known to experts in the field.

The liquid phase separated in the high pressure separator consists of a hydrocarbon fraction, essentially consisting of linear paraffins with a number of carbon atoms varying from 14 to 21, prevalently from 15 to 19. Depending on the operating conditions of the separator, the liquid fraction can contain small quantities of $H_2O$ and oxygenated compounds, such as for example alcohols and carbonyl compounds. The residual S can be lower than 10 ppm. The liquid fraction can then be washed with a gaseous hydrocarbon, for example $CH_4$, or nitrogen or hydrogen, in a stripper, in order to further reduce the water content.

The resulting hydrocarbon mixture is fed to the subsequent hydroisomerization step (2). The hydroisomerization step is carried out in the presence of hydrogen and a catalytic composition which comprises:

a) a carrier of an acid nature comprising a completely amorphous micro-mesoporous silico-alumina having a $SiO_2/Al_2O_3$ molar ratio ranging from 30 to 500, a surface area greater than 500 m$^2$/g, a pore volume ranging from 0.3 to 1.3 ml/g, an average pore diameter lower than 40 Å, b) a metallic component containing one or more metals of group VIII, possibly mixed with one or more metals of group VIB.

The carrier of acid nature (a) of the catalytic composition used in the present invention comprises a silico-alumina preferably having a $SiO_2/Al_2O_3$ molar ratio ranging from 50 to 300.

According to a preferred aspect, the carrier of acid nature (a) comprises a silico-alumina with a porosity ranging from 0.3 to 0.6 ml/g.

Completely amorphous micro-mesoporous silico-aluminas which can be used as carrier (a) of the catalytic compositions of the hydroisomerization step of the present invention are described in U.S. Pat. No. 5,049,536, EP 659478, EP 812804, and called MSA. Their powder XRD pattern does not have a crystalline structure and does not show any peak. U.S. Pat. No. 5,049,536, EP 659478, EP 812804 also describe various methods for preparing silico-aluminas suitable as carrier (a). Silico-aluminas which can be used for example for the process of the present invention can be prepared, in accordance with EP 659478, starting from tetra-alkylammonium hydroxide, an aluminum compound which can be hydrolyzed to $Al_2O_3$, and a silicon compound which can be hydrolyzed to $SiO_2$, wherein said tetra-alkylammonium hydroxide is a tetra ($C_2$-$C_5$)alkylammonium hydroxide, said hydrolyzable aluminum compound is an aluminum tri($C_2$-$C_4$)alkoxide and said hydrolyzable silicon compound is a tetra($C_1$-$C_5$)alkylorthosilicate: these reagents are subjected to hydrolysis and gelification operating at a temperature equal to or higher than the boiling point, at atmospheric pressure, of any alcohol which is developed as by-product of said hydrolysis reaction, without the elimination or substantial elimination of said alcohols from the reaction environment. The gel thus produced is dried and calcined, preferably in an oxidizing atmosphere at a temperature ranging from 500 to 700° C., for a period of 6-10 hours. It is preferable to operate by preparing an aqueous solution of the tetra-alkylammonium hydroxide and aluminum trialkoxide and the tetra-alkylorthosilicate is added to said aqueous solution, operating at a temperature lower than the hydrolysis temperature, with a quantity of the reagents which is such as to respect the $SiO_2/Al_2O_3$ molar ratio of 30/1 to 500/1, the tetra-alkylammonium hydroxide/$SiO_2$ molar ratio of 0.05/1 to 0.2/1 and $H_2O/SiO_2$ molar ratio of 5/1 to 40/1, the hydrolysis and gelification is caused by heating to a temperature higher than approximately 65° C. up to about 110° C., operating in an autoclave at the autogenous pressure of the system, or at atmospheric pressure in a reactor equipped with a condenser.

According to EP 812804, silico-aluminas which can be used as component (a) of the catalytic composition for the hydroisomerization step can be prepared by means of a process which comprises:

preparing a mixture starting from a tetra-alkylorthosilicate, a $C_3$-$C_6$ alkyl alcohol or dialcohol, a tetra-alkylammonium hydroxide having the formula $R_1(R_2)_3NOH$ wherein $R_1$ is a $C_3$-$C_7$ alkyl and $R_2$ is a $C_1$ or $C_3$-$C_7$ alkyl, in the presence of a hydrolyzable aluminum compound, wherein the molar ratios fall within the following ranges:

alcohol/$SiO_2 \leq 20$
$R_1(R_2)_3NOH/SiO_2 = 0.05$-$0.4$
$H_2O/SiO_2 = 1$-$40$
$Al_2O_3/SiO_2$ greater than 0 and less than 0.02 subjecting said mixture to hydrolysis and subsequent gelification at a temperature close to the boiling point of the alcohol or mixture of alcohols present;

subjecting the gel obtained to drying and calcination.

The carrier of an acid nature (a) of the catalyst which is used in the process of the present invention can be in the form of an extruded product containing traditional binders, such as for example aluminum oxide, bohemite or pseudobohemite. The extruded product can be prepared according to techniques well-known to experts in the field. The silico-alumina and the binder can be premixed in weight ratios ranging from 30:70 to 90:10, preferably from 50:50 to 70:30. At the end of the mixing, the product obtained is consolidated into the desired end-form, for example extruded pellets or tablets. According to a preferred embodiment the methods and binders described in EP 550922 and EP 665055 can be used, the latter being preferred, whose contents are incorporated herein as reference.

A typical preparation method of the component of an acid nature (a) in the form of an extruded product (EP 665055) comprises the following steps:

(A) preparing an aqueous solution of a tetra-alkylammonium hydroxide (TAA-OH), a soluble aluminum compound capable of hydrolyzing to $Al_2O_3$ and a silicon compound capable of hydrolyzing to $SiO_2$, in the following molar ratios:
$SiO_2/Al_2O_3$ from 30/1 to 500/1
TAA-OH/$SiO_2$ from 0.05/1 to 0.2/1
$H_2O/SiO_2$ from 5/1 to 40/1
(B) heating the solution thus obtained to cause its hydrolysis and gelification and obtain a mixture A with a viscosity ranging from 0.01 to 100 Pa sec;
(C) adding to the mixture A, first a binder belonging to the group of bohemites or pseudobohemites, in a weight ratio with the mixture A ranging from 0.05 to 0.5, and subsequently a mineral or organic acid in a quantity ranging from 0.5 to 8.0 g per 100 g of binder;
(D) heating the mixture obtained under point (C) to a temperature ranging from 40 to 90° C., until a homogeneous paste is obtained, which is subjected to extrusion and granulation;
(E) drying and calcining the extruded product in an oxidizing atmosphere.

Plasticizing agents, such as methylcellulose, are preferably also added in step (C) to favour the formation of a homogeneous and easily processable paste.

In this way a granular acid carrier is obtained, preferably containing a quantity ranging from 30 to 70% by weight of inert inorganic binder, the remaining quantity consisting of amorphous silico-alumina essentially having the same characteristics with respect to porosity, surface extension and structure described above for the same silico-alumina without a binder.

With respect to the metals contained in the metallic component (b) of the catalytic compositions used in the hydroisomerization step of the process of the present invention, this is selected from metals of group VIII, optionally mixed with one or more metals of group VIB. Compositions containing only metals of group VIII are preferred. The metal or metals of group VIII are preferably selected from Pt, Pd, Ni and Co. In particular, when the metallic component contains only metals of group VIII, the metal or metal are preferably selected from Pt, Pd and Ni. When the metallic component contains both one or more metals of group VIII and one or more metals of group VIB, the metal of group VIII is preferably selected from Ni and Co. The metal of group VIB is preferably selected from Mo and W.

The metal of group VIII is preferably in a quantity ranging from 0.1 to 5% by weight with respect to the total weight of the catalytic composition. The metal of group VIB, when present, is in a quantity ranging from 1 to 50, even more preferably in a quantity ranging from 5 to 35% by weight with respect to the total weight of the catalytic composition. The weight percentage of the metal, or metals, refers to the metal content expressed as a metallic element; in the final catalyst, after calcination, said metal is in the form of an oxide.

The metals of group VIII, and optionally group VI, contained in the catalytic composition used in the hydroisomerization step (2) can be deposited onto the carrier (a) with all the techniques known to experts in the field. Catalytic compositions which can be well used in the hydroisomerization step of the present invention containing one or more metals of group VIII, and their preparations, are described in EP 582347, EP 1101813 and WO 2005/103207.

In particular, EP 582347 describes catalytic compositions, which can be used in the hydroisomerization of n-paraffins, containing one or more metals of group VIII and a carrier of silica and alumina gel amorphous to X-rays, with a $SiO_2/Al_2O_3$ molar ratio ranging from 30 to 500, a surface area within the range of 500 to 1000 m²/g, a pore volume ranging from 0.3 to 0.6 ml/g and a pore diameter prevalently within the range of 10 to 30 Å. EP 1101813 describes catalytic compositions, which can be used for the preparation of middle distillates, containing one or more metals of group VIII and a carrier of a calcined gel of silica and alumina, amorphous to X-rays, with a $SiO_2/Al_2O_3$ molar ratio ranging from 30 to 500, a surface area within the range of 500 to 1000 m²/g, a pore volume ranging from 0.2 to 0.8 ml/g and an average pore diameter within the range of 10 to 40 Å.

WO 2005/103207 describes catalytic compositions which can be used for the upgrading of distillates, containing one or more metals selected from Pt, Pd, Ir, Ru, Rh and Re and a silico-alumina carrier, amorphous to X-rays, with a $SiO_2/Al_2O_3$ molar ratio ranging from 30 to 500, a surface area greater than 500 m²/g, a pore volume ranging from 0.3 to 1.3 ml/g and an average pore diameter less than 40 Å.

In general, in the compositions used in the hydroisomerization step (2), containing only the metal of group VIII, the metal, according to the preparations described in the patents indicated above, can be introduced by means of impregnation or ion exchange. According to the first technique, the component of an acid nature (a), also in extruded form, and preferably in the extruded form prepared according to the process described in EP 665055, is wet with an aqueous solution of a compound of the metal of group VIII, operating for example at room temperature, and at a pH ranging from 1 to 4. The aqueous solution preferably has a concentration of metal expressed as g/l ranging from 0.2 to 2.0. The resulting product is dried, preferably in air, at room temperature, and is calcined in an oxidizing atmosphere at a temperature ranging from 200 to 600° C.

In the case of alcohol impregnation, the acid component (a), also in extruded form, and preferably in the extruded form prepared according to the process described in EP 665055, is suspended in an alcohol solution containing the metal. After impregnation the solid is dried and calcined.

According to the ion exchange technique, the acid component (a), also in extruded form, and preferably in the extruded form prepared according to the process described in EP 665055, is suspended in an aqueous solution of a complex or salt of the metal, operating at room temperature and a pH ranging from 6 to 10. After the ion exchange, the solid is separated, washed with water, dried and finally thermally treated in an inert and oxidizing atmosphere. Temperatures which can be used for the purpose are those ranging from 200 to 600° C.

Compounds of metals which can be well used in the preparations described above are: $H_2PtCl_6$, $Pt(NH_3)_4(OH)_2$, $Pt(NH_3)_4Cl_2$, $Pd(NH_3)_4(OH)_2$, $PdCl_2$, $(CH_3COO)_2Ni$, $(CH_3COO)_2Co$. When the catalytic composition comprises more than one metal of group VIII the impregnation is carried out as follows: the acid component (a), also in extruded form, and preferably in the extruded form prepared according to the process described in EP665055, is wet with a solution of a compound of a first metal, the resulting product is dried, it is optionally calcined, and is impregnated with a solution of a compound of a second metal. The product is dried and is then calcined in an oxidizing atmosphere at a temperature ranging from 200 to 600° C. Alternatively a single aqueous solution containing two or more compounds of different metals can be used for contemporaneously introducing said metals.

Before being used, the catalyst is activated by the known techniques, for example by means of a reduction treatment, and preferably by means of drying and subsequent reduction. The drying is effected in an inert atmosphere at temperatures ranging from 25 to 100° C., whereas the reduction is obtained by thermal treatment of the catalyst in a reducing atmosphere (H$_2$) at a temperature ranging from 300 to 450° C., and a pressure preferably ranging from 1 to 50 bar. Catalytic compositions which can be well used in the hydroisomerization step of the present invention containing one or more metals of group VIII and additionally one or more metals of group VIB, and their preparations, are described in EP 908231 and EP 1050571. In particular, EP 908231 describes catalytic compositions containing a mixture of metals belonging to groups VIB and VIII and a carrier of silica and alumina gel amorphous to X-rays, with a SiO$_2$/Al$_2$O$_3$ molar ratio ranging from 30 to 500, a surface area within the range of 500 to 1000 m$^2$/g, a pore volume ranging from 0.3 to 0.6 ml/g and an average pore diameter within the range of 10 to 40 Å. When the hydroisomerization catalyst also contains a metal of group VIB in the metallic phase (b), the catalyst can be prepared by means of aqueous or alcohol impregnation. More specifically, according to a first technique, the silico-alumina, also in extruded form, and preferably in the extruded form prepared according to the process described in EP 665055, is wet with an aqueous solution of a compound of the desired metal of group VIB, operating at room temperature or a temperature close to room temperature. After aqueous impregnation, the solid is dried and then a new impregnation is effected with an aqueous solution of a compound of the desired metal of group VIII. After aqueous impregnation, the solid is dried again and thermally treated in an oxidizing atmosphere. Suitable temperatures for this thermal treatment range from 200 to 600° C. The aqueous impregnation of the metallic phase can also be effected in a single step, wherein the silico-alumina-based acid carrier is wet with a single aqueous solution containing both of the metal compounds of groups VIB and VIII, subsequently proceeding with the same operating procedures described above. In the alcohol impregnation technique, the silico-alumina, also in extruded form, and preferably in the extruded form prepared according to the process described in EP 665055, is suspended in an alcohol solution of a compound of a metal of group VIB and a compound of a metal of group VIII, operating at room temperature or a value close to room temperature. After impregnation the solid is dried, preferably in air, at a temperature of about 100° C. and thermally treated in an oxidizing atmosphere, preferably in air.

The final hydroisomerization catalyst can be formulated and formed in extruded products having different forms (for example cylindrical, trilobated, etc.) as described for example in EP 1101813.

The catalytic compositions used in the hydroisomerization step of the present invention have the characteristic of being resistant to water: a water-inhibiting effect can be observed on the catalytic activity which can be recuperated however by increasing the temperature, whereas no irreversible deactivation was detected. An increase of a few ° C., from 3 to 5, is typically sufficient for recovering the fall in activity caused by 1000-2000 ppm of H$_2$O in the hydrocarbon charge. It is preferable to operate with a water content around 1000 ppm, even more preferably at a level lower than 300 ppm.

The reactor configuration for the hydroisomerization step is a fixed bed reactor. The thermal control in this case is not critical as the reaction is slightly exothermic. For this reason an adiabatic layered reactor is suitable. In any case, a tube bundle reactor can also be used.

The liquid feed deriving from the hydrodeoxygenation step can be sent into the reactor in equicurrent or in countercurrent with respect to the hydrogen. The countercurrent procedure is preferred when the liquid feed contains a significant level of water and/or oxygenated compounds not converted in the first step of the process (>300 ppm of oxygen)

The water present, or formed by the oxygenated compounds during the hydroisomerization, is therefore removed in gaseous phase in the first part of the catalytic bed, thus reducing the contact time with the rest of the catalyst. A particularly preferred arrangement for this catalytic step is a reactor with a number of layers greater than or equal to 2, in which the first layer covered by the liquid hydrocarbon stream deriving from the hydrodeoxygenation step, therefore corresponding to the last layer covered by the gaseous hydrogen stream, consists not of the catalyst, but of a filler of structured inert material, for example ceramic or stainless steel, or pellets or spherules of inert material, such as pumice, alpha-alumina, glass. The role of the filler is to favour the gas-liquid contact, as the hydrocarbon charge to be isomerized will encounter the gaseous hydrogen stream before flowing onto the catalytic bed, thus being further anhydrified.

The hydroisomerization can be effected at a temperature ranging from 250 to 450° C., preferably from 280 to 380° C., and at a pressure ranging from 25 to 70 bar, preferably from 30 to 50 bar. It is preferable to operate at an LHSV ranging from 0.5 to 2 hours$^{-1}$. The H$_2$/HC ratio preferably ranges from 200 to 1000 Nl/l.

The mixture resulting from the hydroisomerization step is subjected to distillation to obtain a purified hydrocarbon mixture which can be used as diesel fuel.

FIG. 1 illustrates a plant scheme which can be used in the process of the present invention for producing hydrocarbon fractions which can be used as diesel fuel, starting from a mixture of a biological origin (biological mixture) containing esters of fatty acids and optionally amounts of free fatty acids. The scheme of FIG. 1 is in accordance with what is described above in relation to the hydrodeoxygenation (DEOX reactor), purification by means of a high pressure separator and washing (SEP) and hydroisomerization (ISOM reactor) steps. In the scheme, after the hydroisomerization reactor, there are also the subsequent separation steps, by means of a separator and distiller, to isolate the gas oil obtained. The dashed line represents a possible recycling of the effluent deriving from the first step.

Some practical embodiment examples of the process object of the present invention are provided for a more detailed description for purely illustrative purposes of particular aspects of the invention, which however can in no way be considered as limiting the overall scope of the invention itself.

EXAMPLE 1

Preparation of the Catalyst Pt/MSA

Reagents and Materials
The following commercial reagents were used in the preparation described hereunder:
tetrapropylammonium hydroxide (TPA-OH) SACHEM
aluminum tri-isopropoxide FLUKA
tetra-ethylsilicate DYNAMIT NOBEL
alumina (VERSAL 250, Pseudo-Boehmite) LAROCHE
methylcellulose (METHOCEL) FLUKA
The reagents and/or solvents used and not indicated above are those most widely used and can be easily found at normal commercial operators specialized in the field.

PREPARATIVE EXAMPLE (i) Preparation of the Silico-Alumina Gel
A 100 litre reactor was preliminarily washed with 75 litres of a solution at 1% by weight of tetrapropylammonium hydroxide (TPA-OH) in demineralized water, maintaining the liquid under stirring for 6 hours at 120° C. The washing solution is discharged and 23.5 litres of demineralized water, 19.6 kg of an aqueous solution at 14.4% by weight of TPA-OH (13.8 moles) and 600 g of aluminum tri-isopropoxide (2.94 moles) are introduced. The mixture is heated to 60° C. and kept under stirring at this temperature for 1 hour, so as to obtain a limpid solution. The temperature of the solution is then brought to 90° C. and 31.1 kg of tetra-ethylsilicate (149 moles) are rapidly added. The reactor is closed and the stirring rate is regulated to about 1.2 m/s, maintaining the mixture under stirring for three hours at a temperature ranging from 80 to 90° C., with thermostat-regulated control to remove the heat produced by the hydrolysis reaction. The pressure in the reactor rises to about 0.2 MPag. At the end, the reaction mixture is discharged and cooled to room temperature, obtaining a homogeneous and relatively fluid gel (viscosity 0.011 Pa•s) having the following composition molar ratios:

$SiO_2/Al_2O_3=101$
TPA-OH/$SiO_2=0.093$
$H_2O/SiO_2=21$ ii) Preparation of the Extruded Product 1150 g of alumina (VERSAL 150), previously dried for 3 hours in air at 150° C., and 190 g of methylcellulose, are charged into a 10 litre plough mixer, maintained at a stirring rate of 70-80 revs per minute. 5 kg of the silico-alumina gel prepared as described above and left to rest for about 20 hours are then added over a period of time of about 15 minutes, and the mixture is left under stirring for about 1 hour. 6 g of glacial acetic acid are added and the temperature of the mixer is brought to about 60° C., subsequently continuing the stirring until a homogeneous paste is obtained, having the desired consistency for the subsequent extrusion.

The homogenous paste obtained as described above is charged into a HUTT type extruder, extruded and cut into cylindrical pellets having the desired size (about 2×4 mm). The product is left to rest for about 6-8 hours and then dried maintaining it in a stream of air at 100° C. for 5 hours. It is finally calcined in a muffle at 550° C. for 3 hours in a flow of nitrogen and for a further 8 hours in air.

A porous solid with acid characteristics is thus obtained, essentially consisting of silica/alumina (yield 95% with respect to the respective initial reagents), having a BET of 608 $m^2/g$.

iii) Impregnation of the Carrier with Platinum 12.1 ml of an aqueous solution of hydrochloric acid 0.6 M containing 4.5 g/l of hexachloroplatinic acid ($H_2PtCl_6$, 0.133 mmoles) are dripped under slow stirring into a glass recipient containing 10 g of the porous solid prepared as described above. The mixture thus obtained is left under stirring for 16 hours at room temperature. The water is then evaporated at 60° C. in a stream of air, over a period of about 1 hour. The solid obtained is then dried maintaining it at 150° C. for two hours, and calcined by heating in a muffle, in a stream of air, from room temperature to 500° C. over a period of three hours. At the end, a supported catalyst is obtained, which is used in the hydroisomerization step described in example 3 below, having the following characteristics:

59.8% by weight of amorphous silico-alumina ($SiO_2/Al_2O_3$ molar ratio=102)
39.9% by weight of alumina (pseudo-bohemite)
0.3% by weight of platinum
Pore volume: 0.6 ml/g
BET: 600 $m^2/g$
Crushing strength: 10 kg/cm (radial); 90 kg/$cm^2$ (axial)

EXAMPLE 2

Hydrodeoxygenation Step (HDO)

The experimentation is carried out in a continuous reactor fed with soybean oil having the characteristics indicated in Table 1 (refined soybean oil Sipral).

The vegetable oil is fed to the first step with hydrogen in equicurrent in the presence of the commercial hydrogenation catalyst UOP UF 210 based on NiMo/$Al_2O_3$ in sulfided form. The sulfidation of the catalyst is carried out in situ using gas oil containing dimethyldisulfide (DMDS) in a concentration which progressively varies from 3 to 9% by weight, at a temperature progressively varying within the range of 230 to 370° C. and a pressure of 70 bar, with a $H_2$/gas oil ratio of 1300 Nl/l and LHSV of 0.8 $hours^{-1}$. The vegetable oil is fed to the reactor in the presence of a small quantity of DMDS (0.025%) to keep the catalyst in sulfided form.

The feed and hydrogen go through the reactor in down flow mode.

The operating conditions used are the following:
Average temperature: 340-350° C.
LHSV: 1 $hour^{-1}$
Pressure: 35 bar
$H_2$/oil: 1500 Nl/l

TABLE 1

|  | Refined Soya Oil |
|---|---|
| Palmatic acid %* (C16-0) | 13.06 |
| Stearic acid %* (C18-0) | 0.84 |
| Oleic acid %* (C18-1) | 27.09 |
| Linoleic acid %* (C18-2) | 53.63 |
| Linolenic acid %* (C18-3) | 5.11 |
| Arachidic acid % (C20-0) | 0.07 |
| Acidity (mgKOH/g)¯ | 0.11 |
| $H_2O$ (ppm) | 2200 |
| Na (ppm) | 0.3 |
| K (ppm) | 0.7 |
| Ca (ppm) | 0.3 |
| Mg (ppm) | 0.1 |
| Al (ppm) | 0.01 |
| P (ppm) | 0.65 |
| Fe (ppm) | <0.05 |
| Cu (ppm) | 0.02 |

*The first number in brackets indicates the carbon atoms, the second the unsaturations.

The effluent product is separated in a gas/liquid separator from the gaseous fraction consisting of $H_2$, CO/$CO_2$ and light hydrocarbons almost totally consisting of $C_3H_8$.

Figure 2:
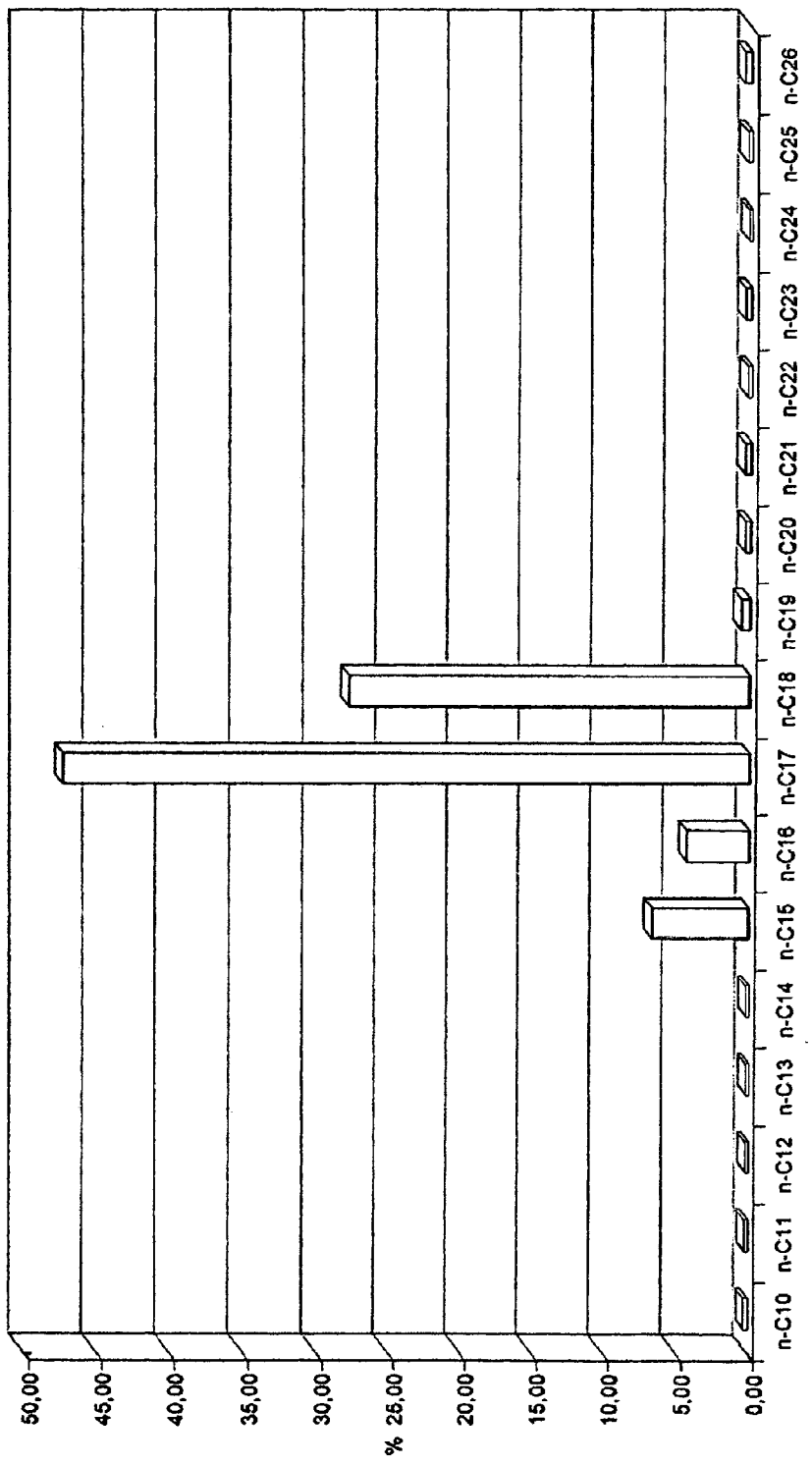

The liquid product, after separation of the water, consists of n-paraffins, whose characteristics and distribution are indicated in Table 2 below and in FIG. 2.

TABLE 2

| Density (g/ml) | 0.7916 |
|---|---|
| Carbon (% w/w) | 84.64 |
| Hydrogen (% w/w) | 14.83 |
| Nitrogen (ppm) | <1 |
| Sulphur (ppm) | 3 |
| Oxygen (by difference, %) | 0.5 |
| $H_2O$ (after anhydrification, ppm) | 100 |
| Mono aromatic compounds (%) | 2.9 |
| Di aromatic compounds (%) | 0.5 |
| Tri aromatic compounds (%) | 0.1 |
| Total aromatic compounds (%) | 3.5 |
| Cloud point | 21 |
| Gasoline in the feedstock (180° C., %) | 0 |
| Gas oil in the feedstock (180-380° C., %) | 96 |
| Heavy products in the feedstock (340+° C., %) | 5 |
| Heavy products in the feedstock (380+° C., %) | 4 |

TABLE 2-continued

Simulated distillation (ASTM D2887)

| | |
|---|---|
| Initial point, °C. | 173 |
| 2% | 269 |
| 5% | 272 |
| 10% | 288 |
| 50% | 309 |
| 90% | 324 |
| 95% | 351 |
| 98% | 412 |
| Final point, °C. | 462 |

Paraffin distribution (%)

| | |
|---|---|
| total n-paraffins | 90.92 |
| total iso-paraffins | 9.08 |
| n-paraffins C11– | 0.85 |
| iso-paraffins C11– | 0.2 |
| n-paraffins C12-C20 | 87.7 |
| iso-paraffins C12-C20 | 6.5 |
| n-paraffins C20+ | 2.4 |
| iso-paraffins C20+ | 3.1 |

EXAMPLE 3

Hydroisomerization Step

The product obtained in the deoxygenation step described in example 2, containing 100 ppm of residual $H_2O$, is treated in equicurrent with hydrogen in the presence of the Pt/MSA catalyst prepared in the previous example 1. The operating conditions used are indicated in Table 3

TABLE 3

| | |
|---|---|
| Temperature | 340-360° C. |
| LHSV | 2 hour$^{-1}$ |
| Pressure | 35 bar |
| $H_2$/HC | 1,000 Nl/l |

The effluent from the hydroisomerization reactor consists of a gaseous phase and a liquid phase, the two phases are separated in a gas/liquid separator, the gaseous phase analyzed via GC consists of $C_3$/$C_4$ light paraffins (LPG), whereas the liquid phase separated, containing paraffins with a number of carbon atoms ranging from 5 to 22, is analyzed by means of GC to evaluate the isomerization level, which, under these operating conditions is 79%, and used to evaluate the distillation curve.

The hydrocarbon is then sent to a distillation column in order to separate the gasoline fraction (12.7%) from the diesel fraction (87.3%). This latter fraction, containing paraffins with a number of carbon atoms ranging from 12 to 22, was characterized and the main properties are indicated in Table 4 below:

TABLE 4

| | | |
|---|---|---|
| Density, g/cm$^3$ | ASTM D 4052-96 | 0.785 |
| Sulphur, ppm | ISO 20846 | 0 |
| Cloud point, °C. | ASTM D2500-05 | −12 |
| Cetane number | ENI ISO 5165 | >76 |
| Total aromatic compounds % | | <1 |
| Iso paraffins, % | | 80 |
| n-paraffins, % | | 20 |

Simulated distillation (ASTM D2887)

| | |
|---|---|
| 5%, °C. | 225 |
| 10%, °C. | 262 |
| 50%, °C. | 301 |
| 90%, °C. | 317 |
| 95%, °C. | 322 |

Figure 3:
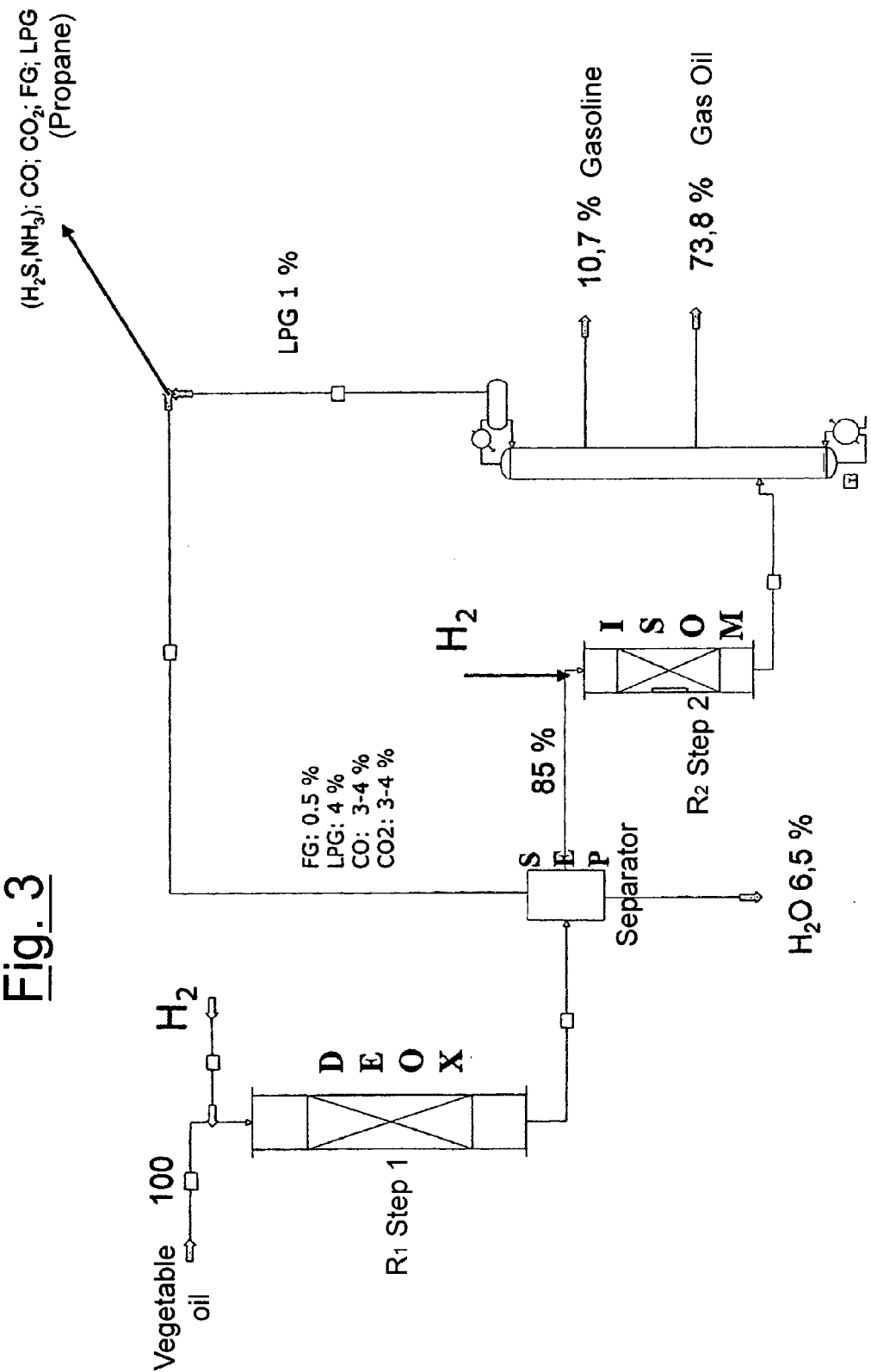

FIG. 3 shows the overall material balance of the process relating to examples 2 and 3, the hydrodeoxygenation step is effected in the reactor DEOX, SEP is the gas liquid separator and ISOM is the reactor in which the hydroisomerization step is effected. After the hydroisomerization reactor, the distillation column is represented, from which the diesel fraction is recovered.

The invention claimed is:

1. A process for producing a hydrocarbon fraction which can be used as diesel fuel or as a component of diesel fuel, starting from a mixture of biological origin containing esters of fatty acids, and optionally containing free fatty acids, which comprises:
    1) hydrodeoxygenation of the mixture of biological origin containing esters of fatty acids and optionally free fatty acids, wherein the hydrodeoxygenation is the first step of the process; and
    2) hydroisomerization of the mixture resulting from (1), after optional purification treatment, said hydroisomerization being effected in the presence of a catalytic system which comprises:
        a) a carrier of acid nature comprising a completely amorphous micro-mesoporous silico-alumina having a $SiO_2$/$Al_2O_3$ molar ratio ranging from 30 to 500, a surface area higher than 500 m$^2$/g, a pore volume ranging from 0.3 to 1.3 ml/g, an average pore diameter lower than 40 Å, and
        b) a metallic component containing one or more metals of group VIII, optionally mixed with one or more metals of group VIB.

2. The process according to claim 1, wherein the mixture of biological origin is a mixture of a vegetable or animal origin.

3. The process according to claim 1 or 2, wherein the esters of fatty acids contained in the mixtures of a biological origin are triglycerides of fatty acids, in which the hydrocarbon chain of the fatty acid contains from 12 to 24 carbon atoms and is mono- or poly-unsatured.

4. The process according to claim 1 or 2, wherein the mixtures of biological origin can be selected from vegetable oils, vegetable fats, animal fats, fish oils or mixtures thereof.

5. The process according to claim 4, wherein the vegetable oils or fats, optionally deriving from plants selected by means of genetic manipulation, are selected from sunflower oils, rape, canola, palm, soybean, hemp, olive, linseed, mustard, peanut, castor, coconut oils or fatty oils contained in the pulp of pine trees (tall oil), recycled oils or fats of the food industry and mixtures thereof, and the animal oils or fats are selected from bacon-fat, lard, tallow, milk fats, recycled oils or fats of the food industry and mixtures thereof.

6. The process according to claim 1, wherein the mixtures of biological origin are mixed with one or more hydrocarbons before being fed to step (1).

7. The process according to claim 1, wherein step (1) is carried out in the presence of hydrogen and a hydrogenation catalyst containing a carrier and one or more metals selected from metals of group VIII and group VIB.

8. The process according to claim 7, wherein the carrier for the catalyst of step (1) is selected from alumina, silica, zirconia, titania or mixtures thereof.

9. The process according to claim 7, wherein the metal or metals contained in the catalyst of step (1) are selected from Pd, Pt, Ni, or from the pairs of metals Ni—Mo, Ni—W, Co—Mo and Co—W.

10. The process according to claim 7, wherein the catalyst of step (1) is selected from the catalytic compositions Ni—Mo—P on zeolite, Pd/Zeolite, Pt/MSA.

11. The process according to claim 1, wherein step (1) is carried out at a pressure ranging from 25 to 70 bar and a temperature ranging from 240 to 450° C.

12. The process according to claim 11, carried out at a temperature ranging from 270 to 430° C.

13. The process according to claim 11, wherein the pressure ranges from 30 to 50 bar.

14. The process according to claim 11, carried out at a LHSV ranging from 0.5 to 2 hour$^{-1}$.

15. The process according to claim 11, wherein in step (1) an $H_2$/mixture of biological origin ratio ranging from 400 to 2000 N1/1 is adopted.

16. The process according to claim 7 or 9, wherein the catalysts based on Ni—Mo, Ni—W, Co—Mo and Co—W are sulfided before being used.

17. The process according to claim 16, wherein in order to maintain the catalyst in sulfided form, the sulfiding agent or, alternatively, a straight-run gas oil with a high sulfur content is fed contemporaneously to the mixture of biological origin.

18. The process according to claim 1, wherein the mixture of biological origin is subjected to a pretreatment before being fed to step (1), wherein said pretreatment is effected by absorption, treatment with ion exchange resins or slightly acid washings.

19. The process according to claim 1, wherein the mixture resulting from step (1) is subjected to a purification treatment before being subjected to hydroisomerization, wherein the purification treatment comprises a separation step and a washing step.

20. The process according to claim 1, wherein step (2) is carried out in the presence of hydrogen and a catalytic system which comprises:
   a) a carrier of acid nature comprising a completely amorphous micro-mesoporous silico-alumina having a $SiO_2/Al_2O_3$ molar ratio ranging from 30 to 500, a surface area higher than 500 m$^2$/g, a pore volume ranging from 0.3 to 1.3 ml/g, an average pore diameter lower than 40 Å,
   b) a metallic component containing one or more metals of group VIII, optionally mixed with one or more metals of group VIB.

21. The process according to claim 1 or 20, wherein in step (2) the silico-alumina contained in the carrier of acid nature (a) has a $SiO_2/Al_2O_3$ molar ratio ranging from 50 to 300.

22. The process according to claims 1 or 20, wherein in step (2) the silico-alumina contained in the carrier of acid nature (a) has a porosity ranging from 0.3 to 0.6 ml/g.

23. The process according to claim 1, wherein in step (2) the component of an acid nature (a) of the catalytic system is in the form of an extruded product containing a binder.

24. The process according to claim 23, wherein in step (2) the component of acid nature (a) of the catalytic system in the form of an extruded product containing a binder is prepared by means of a process which comprises the following steps:
   (A) preparing an aqueous solution of a tetra-alkylammonium hydroxide (TAA-OH), a soluble aluminum compound capable of hydrolyzing to $Al_2O_3$ and a silicon compound capable of hydrolyzing to $SiO_2$, in the following molar ratios:
   $SiO_2/Al_2O_3$ from 30/1 to 500/1
   TAA-OH/$SiO_2$ from 0.05/1 to 0.2/1
   $H_2O$/$SiO_2$ from 5/1 to 40/1
   (B) heating the solution thus obtained to cause its hydrolysis and gelification and obtain a mixture A with a viscosity ranging from 0.01 to 100 Pa sec;
   (C) adding to the mixture A, first a binder belonging to the group of bohemites or pseudobohemites, in a weight ratio with the mixture A ranging from 0.05 to 0.5, and subsequently a mineral or organic acid in a quantity ranging from 0.5 to 8.0 g per 100 g of binder;
   (D) heating while stirring the mixture obtained under point (C) to a temperature ranging from 40 to 90° C., until a homogeneous paste is obtained, which is subjected to extrusion an granulation;
   (E) drying and calcining the extruded product in an oxidizing atmosphere.

25. The process according to claim 1, wherein in step (2) the catalytic system contains as metallic component (b) one or more metals of group VIII selected from Pt, Pd, Ni, Co.

26. The process according to claim 25, wherein the catalytic system contains only metals from group VIII and said metals are preferably selected from Pt, Pd and Ni.

27. The process according to claim 25, wherein the catalytic system contains both one or more metals of group VIII and one or more metals of group VIB and said metals of group VIII are selected from Ni and Co.

28. The process according to claim 1, 25 or 27, wherein in step (2) the catalytic system contains as metallic component (b) both one or more metals of group VIII and one or more metals of group VIB and said metals of group VIB are selected from Mo and W.

29. The process according to claim 1, wherein in the catalytic system of step (2), the metal of group VIII is in a quantity ranging from 0.1 to 5% by weight with respect to the total weight of the catalyst.

30. The process according to claim 1, wherein in the catalytic system of step (2), the metal of group VIB is in a quantity ranging from 1 to 50% by weight with respect to the total weight of the catalyst.

31. The process according to claim 30, wherein the metal of group VIB is in a quantity ranging from 5 to 35% by weight.

32. The process according to claim 1, wherein in step (2) the catalytic system comprises one or more metals of group VIII and a silica and alumina gel carrier amorphous to X-rays, with a $SiO_2/Al_2O_3$ molar ratio ranging from 30 to 500, a surface area within the range of 500 to 1000 m$^2$/g, a pore volume ranging from 0.3 to 0.6 ml/g, an average pore diameter within the range of 10 to 30 Å.

33. The process according to claim 1, wherein in step (2) the catalytic system comprises one or more metals of group VIII and a carrier of a calcined silica and alumina gel amorphous to X-rays, with a $SiO_2/Al_2O_3$ molar ratio ranging from 30 to 500, a surface area within the range of 500 to 1,000 m$^2$/g, a pore volume up to 0.8 ml/g and an average pore diameter within the range of 10 to 40 Å.

34. The process according to claim 1, wherein in step (2) the catalytic system comprises one or more metals selected from Pt, Pd, Ir, Ru, Rh and Re and a silica alumina carrier amorphous to X-rays, with a $SiO_2/Al_2O_3$ molar ratio ranging from 30 to 500, a surface area higher than 500 m$^2$/g, a pore volume ranging from 0.3 to 1.3 ml/g and an average pore diameter less than 40 Å.

35. The process according to claim 1, wherein in step (2) the catalytic system contains a mixture of metals belonging to groups VIB and VIII and a carrier of silica and alumina gel amorphous to X-rays, with a $SiO_2/Al_2O_3$ molar ratio ranging from 30 to 500, a surface area within the range of 500 to 1000 m$^2$/g, a pore volume ranging from 0.3 to 0.6 ml/g and a pore diameter within the range of 10-40Å.

36. The process according to claim 1 or 20, wherein the hydroisomerization step (2) is carried out at a temperature ranging from 250 to 450° C., and a pressure ranging from 25 to 70 bar.

37. The process according to claim 36 carried out at a temperature ranging from 280 to 380° C.

38. The process according to claim 36 carried out at a pressure ranging from 30 to 50 bar.

39. The process according to claim 36 carried out at a LHSV ranging from 0.5 to 2 hour$^{-1}$ and with an H$_2$/HC ratio ranging from 200 to 1,000 hour$^{-1}$.

40. The process according to claim 1 or 7, wherein step (1) is carried out in a reaction zone comprising one or more catalytic beds, in one or more reactors.

41. The process according to claim 40, wherein step (1) is carried out in a fixed bed hydrotreating reactor.

42. The process according to claim 7, wherein in step (1) the hydrogen stream and feedstock of biological origin can be sent in equicurrent or in countercurrent.

43. The process according to claim 7, wherein the reactor has adiabatic layers in a number greater than or equal to 2.

44. The process according to claim 40, wherein a stream of hydrogen and/or feedstock liquid at a certain temperature, is sent between one catalytic bed and another to create a constant or increasing temperature profile.

45. The process according to claim 7, wherein the reactor is a tube-bundle reactor with the catalyst charged inside the tubes, and a diathermic liquid which is sent into the mantle side.

46. The process according to claim 43 or 45, wherein the reactor is run with the recirculation of a part of the effluents.

47. The process according to claim 46, wherein the recycling ratio, i.e. the amount of recirculated fraction with respect to the fresh feedstock varies from 0.5 to 5 weight/weight.

48. The process according to claim 7, wherein a slurry reactor is used, wherein the hydrodeoxygenation catalyst consists of microspheres and is dispersed into the reaction environment and the mixing is effected by means of mechanical stirring or by forced recirculation of the reaction fluids.

49. The process according to claim 19, wherein, in the separation step, the mixture resulting from step (1) is sent to a high-pressure gas-liquid separator to recover a gaseous phase and a liquid phase.

50. The process according to claim 49, wherein the gaseous phase, containing hydrogen, water, CO, CO$_2$, light paraffins (C4−) and optionally small quantities of NH$_3$, PH$_3$ and H$_2$S, is cooled by condensation and the water and condensable hydrocarbons are separated, and the remaining gaseous phase is purified to obtain hydrogen which can be recycled to the reaction step (1).

51. The process according to claim 49, wherein the liquid phase separated in the high-pressure separator, consisting of a hydrocarbon fraction, essentially consisting of linear paraffins with a number of carbon atoms ranging from 14 to 21, is washed with hydrogen or nitrogen or a gaseous hydrocarbon, in a stripper, before being fed to the subsequent hydroisomerization step (2).

52. The process according to claim 1, wherein the hydroisomerization step (2) is carried out in a fixed bed reactor.

53. The process according to claim 52, wherein the fixed bed reactor has adiabatic layers.

54. The process according to claim 1, 52 or 53, wherein the mixture which is subjected to hydroisomerization is fed to the hydroisomerization reactor in equicurrent or in countercurrent with respect to the hydrogen.

55. The process according to claim 54, wherein said process is effected in countercurrent in a reactor with a number of layers greater than or equal to 2, wherein the first layer covered by the mixture which is subjected to hydroisomerization consists of a filling of structured inert material or pellets or spherules of inert material.

\* \* \* \* \*